United States Patent [19]
Buns

[11] Patent Number: 5,624,054
[45] Date of Patent: Apr. 29, 1997

[54] METHOD AND APPARATUS FOR FEEDING BALLS AT A UNIFORM RATE

[75] Inventor: James Buns, Grayslake, Ill.

[73] Assignee: Wes-Tech Automation Systems, Buffalo Grove, Ill.

[21] Appl. No.: 483,611

[22] Filed: Jun. 7, 1995

[51] Int. Cl.⁶ .................................................. B65G 59/00
[52] U.S. Cl. .......................... 221/6; 221/200; 221/233; 221/266; 221/278; 221/281
[58] Field of Search ..................... 221/6, 17, 200, 221/233, 236, 266, 268, 278, 281

[56] References Cited

U.S. PATENT DOCUMENTS

| | | | |
|---|---|---|---|
| 2,956,661 | 10/1960 | Radcliffe | 221/6 |
| 3,039,531 | 6/1962 | Scott | 221/266 |
| 3,410,453 | 11/1968 | Lawrence | 221/200 |
| 3,540,622 | 11/1970 | Spisak | 221/233 |
| 3,552,600 | 1/1971 | Hoffman | 221/266 |
| 3,838,663 | 10/1974 | Focke | 221/6 |

FOREIGN PATENT DOCUMENTS

| | | | |
|---|---|---|---|
| 406024542 | 2/1994 | Japan | 221/200 |
| 406023632 | 2/1994 | Japan | 221/200 |

*Primary Examiner*—H. Grant Skaggs
*Attorney, Agent, or Firm*—Baker & McKenzie

[57] ABSTRACT

A compact and lightweight ball bearing feeding device for use in connection with a production process. The device is easily adapted to be mounted at any point along such production process and includes a canister for maintaining a supply of ball bearings, a loading tube for transferring ball bearings from the canister to a two-position loading device, the loading device which places an individual ball bearing in an ejecting position and a delivery tube through which a ball bearing may be delivered to a desired production point. The device does not require any electrical power, employs pneumatic actuation for its operation, automatically senses when a supply of ball bearings is running low and minimizes the introduction of contaminants and magnetism into the ball bearings.

10 Claims, 4 Drawing Sheets

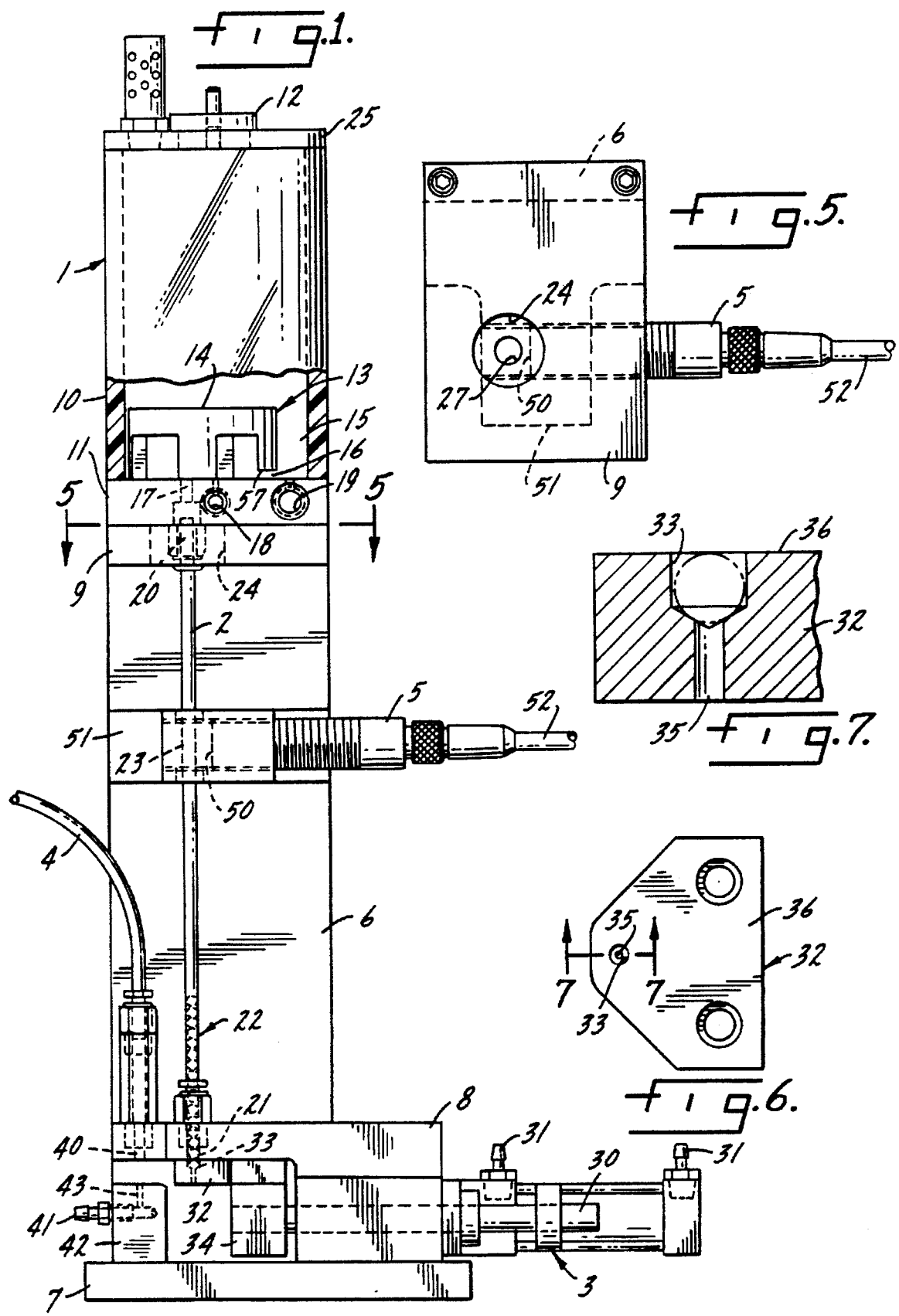

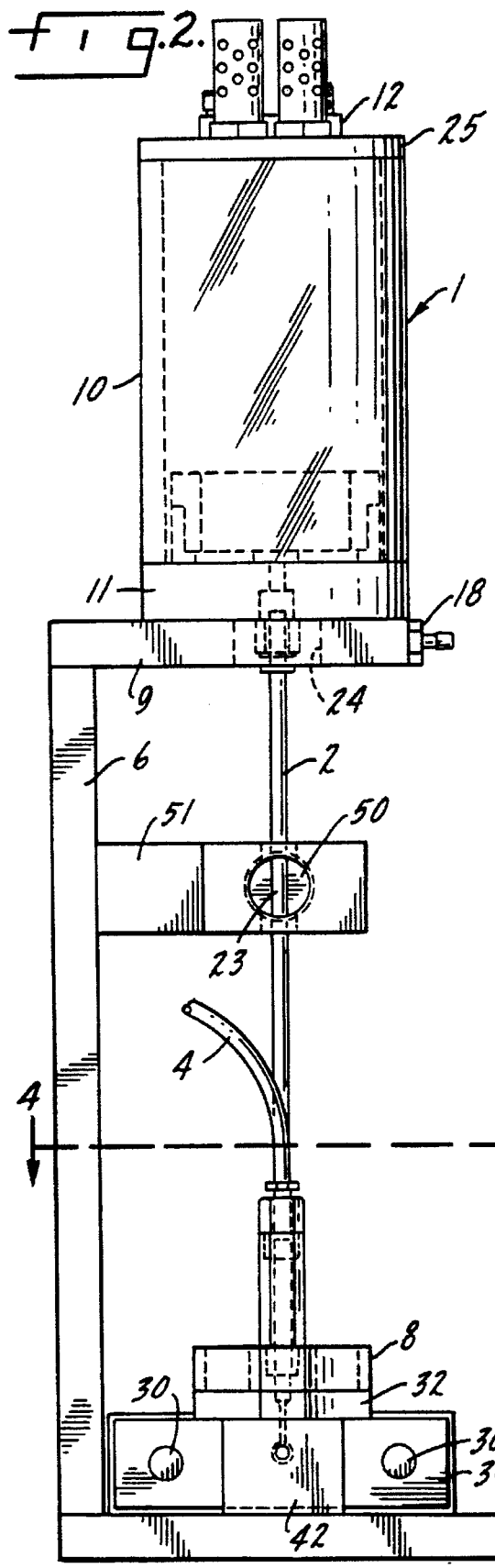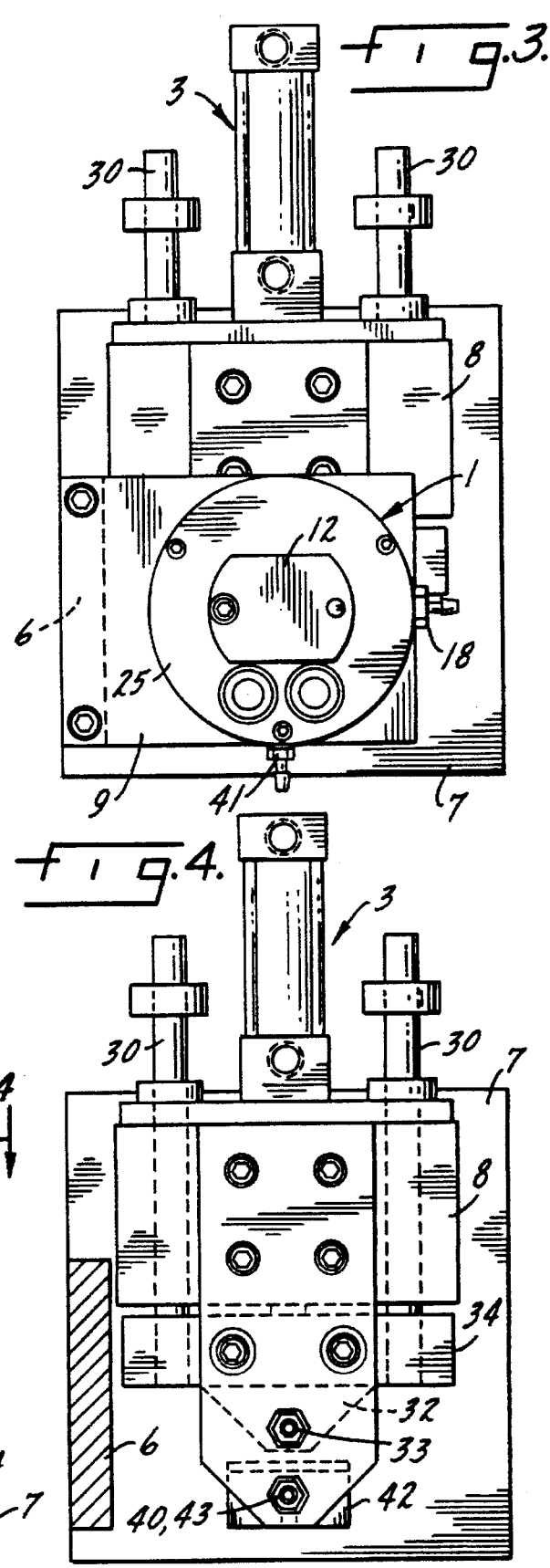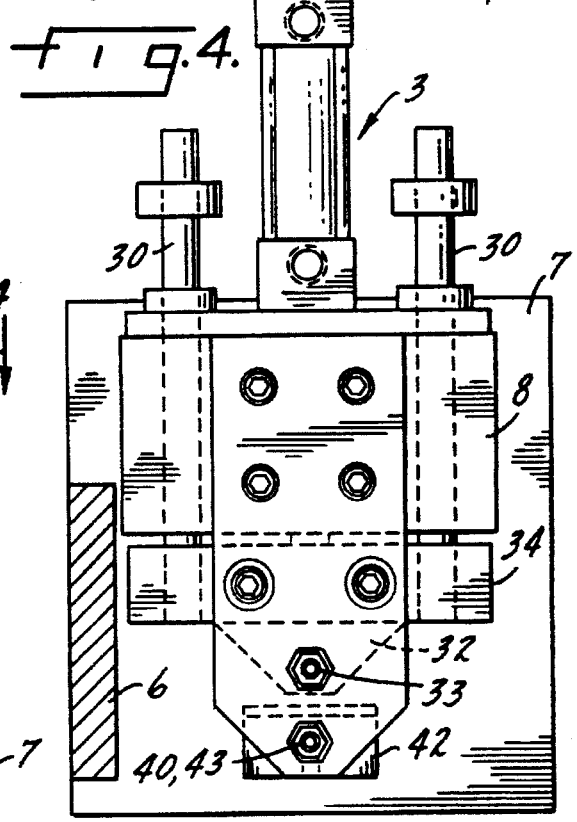

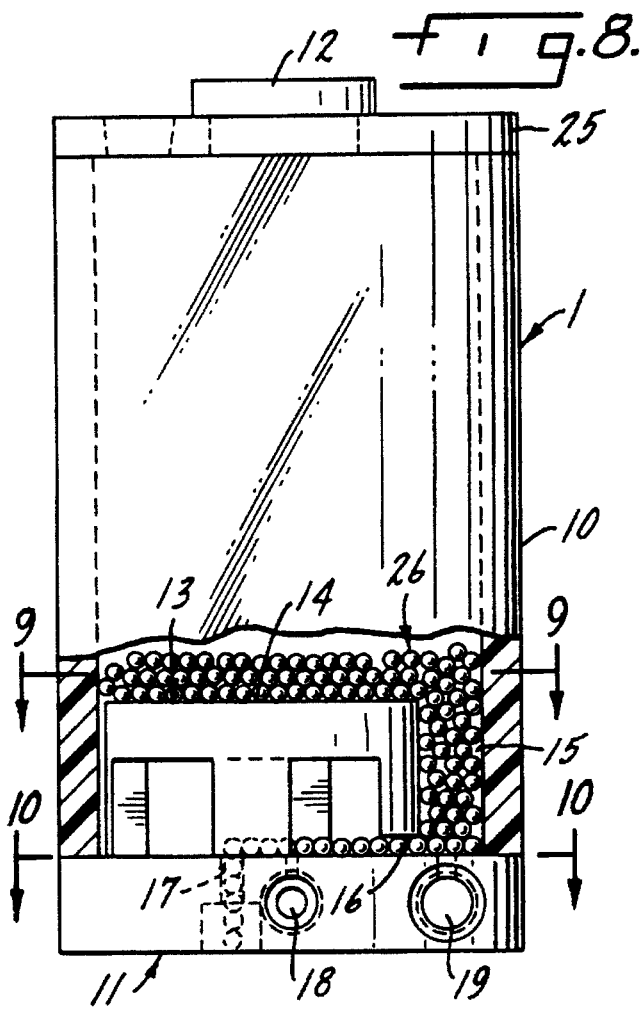
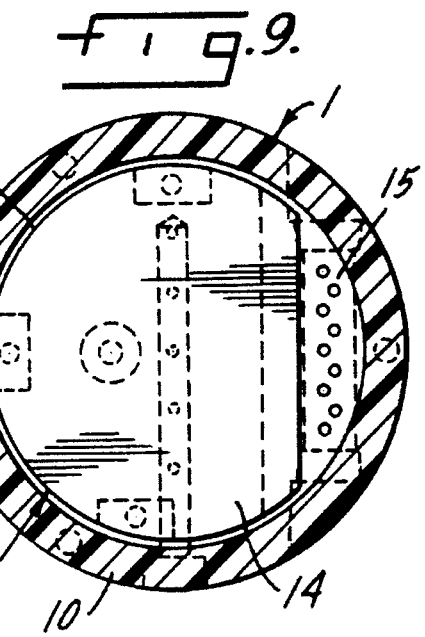
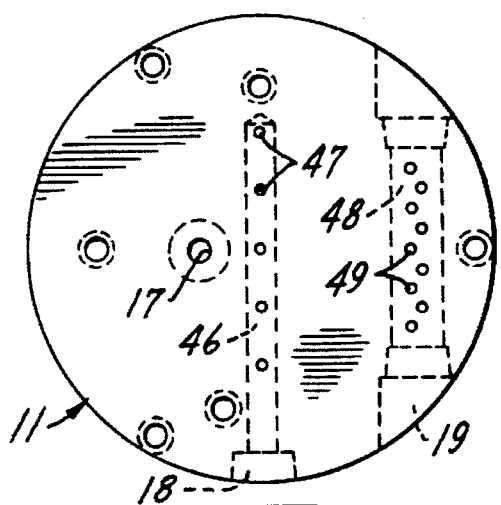
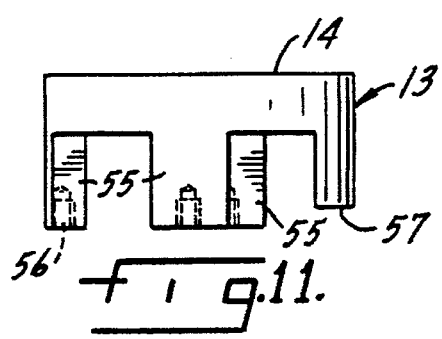
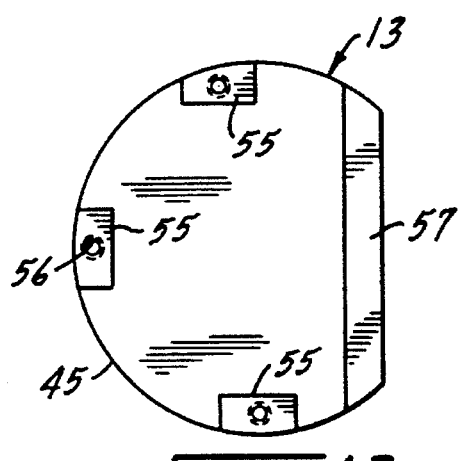
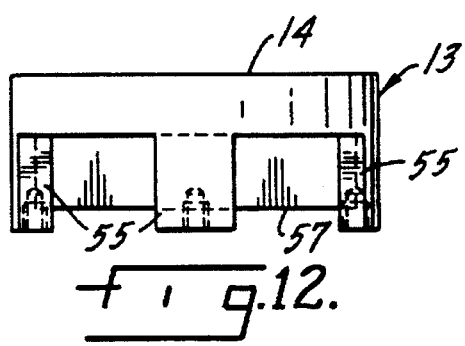

METHOD AND APPARATUS FOR FEEDING BALLS AT A UNIFORM RATE

FIELD OF THE INVENTION

The present invention relates generally to devices which automatically deliver a steady supply of ball bearings as part of an overall production process and, more specifically, to a lightweight ball bearing feeder device which is completely driven by compressed air and delivers ball bearings to a particular assembly point in a clean, dry and efficient manner.

BACKGROUND OF THE INVENTION

There are many production processes which require, usually as one step along such processes, the supply and delivery of ball bearings to a particular assembly point. Indeed, given the variety of applications in which ball bearings form an integral part of an overall assembly, an equally wide variety of distribution methods have been developed by which ball bearings may be delivered.

One of the more common and widely accepted methods of delivering ball bearings in a production process is one which has incorporated a vibrating ball bearing container. This motorized (electric) unit generally has an open top by which a large supply of ball bearings may be loaded. By vibrating vigorously during its operation, the vibratory unit shakes the ball bearings toward a distribution channel. A steady stream of ball bearings then follows this channel to their ultimate distribution point along the production process.

There are a variety of concerns associated with the distribution of ball bearings in a production process which production managers must continually address. Such concerns typically relate to the contamination of the ball bearings due to dirt and debris in the surrounding area and the induction of magnetism into both the ball bearings themselves and the final product being produced. Other practical concerns involve the ability to position the large structural support frame required for a conventional vibratory ball feeder at the desired production point and the necessity of supplying the unit with electrical power.

Thus, while the conventional vibratory ball feeder has arguably become the standard for distributing ball bearings as part of a production process, it has also exhibited some obvious drawbacks. Given its size and physical configuration, the vibratory ball feeder is often difficult to mount in the desired location. It is also necessary to ensure that power is made available in the near vicinity of the unit. Furthermore, conventional vibratory ball feeders tend to be "open"—failing to inhibit the contamination of the ball bearings from dirt and debris. Often ignored also is the (semi-)ferrous construction of conventional vibratory ball feeders which have the potential of inducing magnetism into both the ball bearings themselves and the product being produced.

From the foregoing, it should be recognized that there is still a need in the production industry for a relatively inexpensive ball bearing feeding device which can be easily mounted at any point along a production line, does not require electrical power for its operation, minimizes the potential for either contamination or magnetism of the ball bearings and operates in a simple and efficient manner.

SUMMARY OF THE INVENTION

The present invention overcomes the short comings associated with conventional ball bearing feeders by providing a method and apparatus for feeding ball bearings which employs an enclosed ball bearing container, a loading tube for transferring ball bearings from the container to a bearing loading device, a two-position loading device which places a single ball bearing in position to be distributed and a distribution tube which carries the ball bearings to their final destination point. Together, these components operate (pneumatically) to provide a clean, dry and magnetic-free source of ball bearings to a particular point along a production line.

The canister of the present invention is a substantially cylindrical and sealable unit which may accommodate a relatively large supply of ball bearings. Mounted within the canister is a uniquely designed ball trap which allows only a single layer of ball bearings to pass beneath it toward an opening in the canister's floor. This floor also includes a plurality of pneumatic input and output apertures which assist in agitating the ball bearings toward the opening. It should be noted that the design of the present invention is completely driven by compressed air (pneumatic) and does not require any electrical power. As compressed air is inevitably available in the area of a production process, the relatively small amount of compressed air required by the present invention will be supplied by the particular assembly machine that the unit is applied to.

As ball bearings drop through the opening in the floor of the canister, they proceed to fill up a substantially vertical loading tube. For convenience, a proximity sensor is mounted at an approximate midpoint of this loading tube to sense when the supply of ball bearings in the unit is running low. The bottom end of the loading tube opens into a ball shuttle which is capable of receiving a single ball bearing. This ball shuttle is integrally formed in a two position piston assembly which, in turn, shifts the ball bearings one at a time from the loading tube to the opening of a distribution tube. Such actuation is again performed pneumatically.

As a single ball bearing is placed at the opening of the distribution tube, a burst of compressed air is allowed to enter the ball shuttle whereby the resident ball bearing is subsequently forced out of the ball shuttle and through the distribution tube to the desired destination point. After delivery, the piston assembly and ball shuttle return to their initial position whereby another ball bearing may be loaded.

It is therefore a general object of the present invention to provide an apparatus for feeding ball bearings in a production process which can be easily mounted at any point along such assembly line.

In addition, it is an object of the present invention to provide a ball bearing feeder unit which protects the ball bearings from outside contaminants.

Another object of the present invention is to eliminate the unit's requirement for electrical power.

It is a further object of the present invention to provide a ball bearing feeder unit wherein all components which contact the ball bearings are constructed from non-ferrous materials.

In another one of its aspects, it is an object of the present invention to provide a ball bearing feeder unit which is considerably less expensive than those devices which are currently employed in the manufacturing industry.

Further objects and advantages of the invention will become apparent to those of ordinary skill in the pertinent art upon review of the following detailed description, accompanying drawing and appended claims.

BRIEF DESCRIPTION OF THE DRAWING

The present invention is illustrated more or less diagrammatically in the accompanying drawing, wherein:

FIG. 1 is a front view of the present invention with the piston assembly in a loading position;

FIG. 2 is a side view of the present invention;

FIG. 3 is a top view of the present invention;

FIG. 4 is a top view of the piston assembly of the present invention taken along line 4—4 of FIG. 2;

FIG. 5 is a top view of the proximity sensor and associated mounting bracket taken along line 5—5 of FIG. 1;

FIG. 6 is a top view of the shuttle block of the present invention;

FIG. 7 is a cross-sectional view of the shuttle block, with portions removed, detailing the configuration of the ball shuttle;

FIG. 8 is a side cross-sectional view of the canister of the present invention including a supply of ball bearings;

FIG. 9 is a top view of the ball trap and canister floor of the present invention taken along line 9—9 of FIG.8;

FIG. 10 is a top view of the canister floor of the present invention taken along line 10—10 of FIG. 8;

FIG. 11 is a front view of the ball trap of the present invention;

FIG. 12 is a side view of the ball trap of the present invention;

FIG. 13 is a top view of the ball trap of the present invention; and

Figure 14:
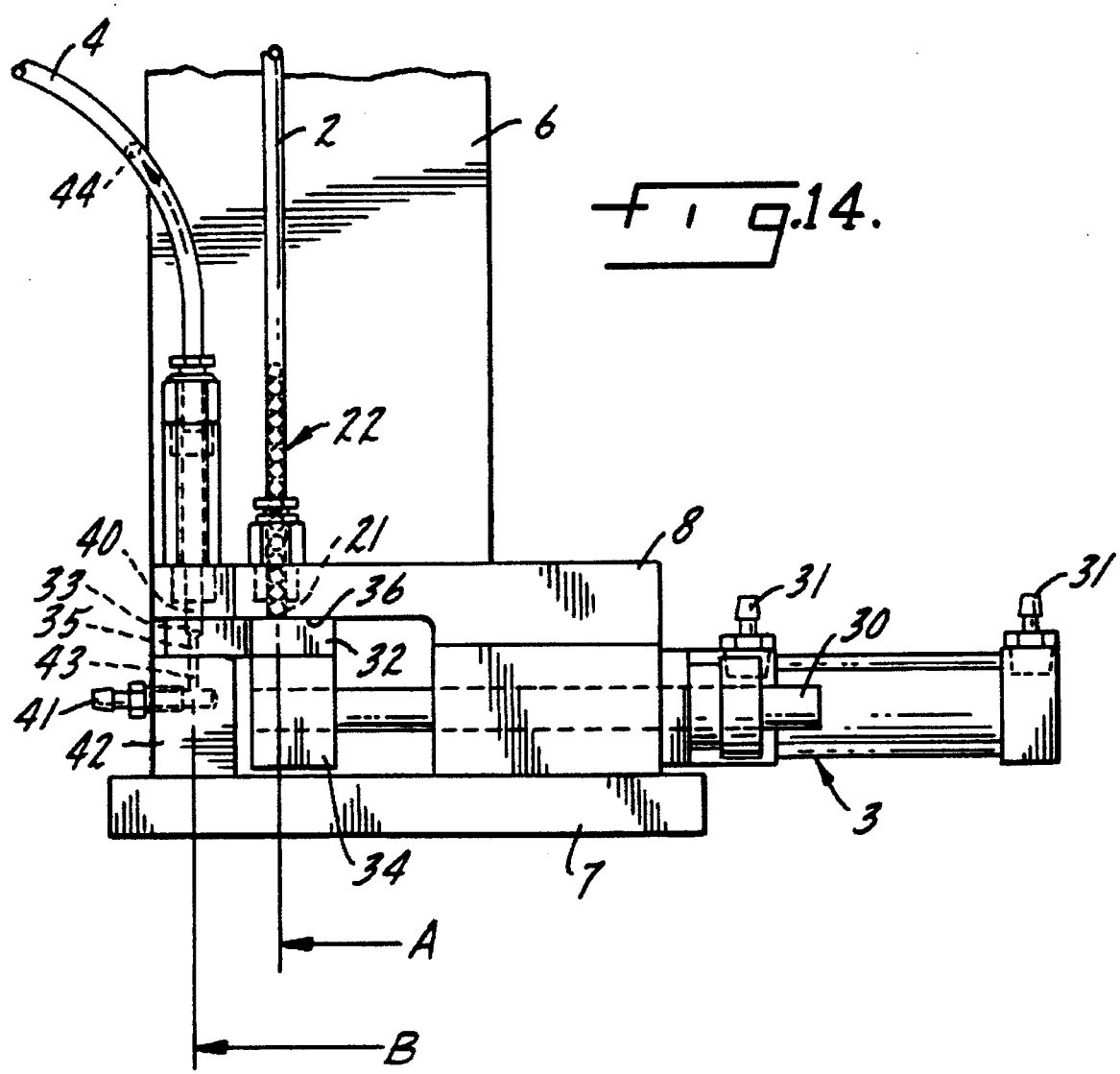
FIG. 14 is a front view of the piston assembly of the present invention in an ejecting position.

Notice must be taken that the figures are not necessarily to scale and that the embodiments are sometimes illustrated by graphic symbols, phantom lines, and diagrammatic representations. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWING

Like reference numerals will be used to refer to like or similar parts from FIG. to FIG. In the following description of the drawing.

Turning first to FIG. 1, the ball bearing feeding apparatus of the present invention is there shown to include its primary components. Such components include canister 1, loading tube 2, piston assembly 3, discharge tube 4 and proximity sensor 5. These primary components are mounted together as a single unit upon the combination of frame 6, base 7 and upper platform 9.

An explanation of the operation of this unit begins with a detailed look at canister 1. Canister 1 has a substantially tubular shape defined by clear acrylic walls 10. A bottom edge of these walls is securely sealed to floor 11 while the top edge of these walls 10 is sealed to canister top 25. Cap 12 is removably mounted to canister top 25 to allow canister 1 to be filled with a supply of ball bearings. The combination of canister 1, floor 11, canister top 25 and cap 12 provides for a substantially contaminant-free environment for the ball bearings.

Mounted within canister 1 upon floor 11 is ball trap 13. This uniquely-designed device has a trap top 14 which is intended to support a substantial majority of a supply of ball bearings within canister 1 while a relative minority are allowed to fall through vertical channel 15. Indeed, each ball bearing within canister 1 ultimately travels down through vertical channel 15, through horizontal pass 16 (the small gap formed between trap face 57 and floor 11) and down through floor opening 17.

Integrally formed within floor 11 are floor opening 17, pneumatic input 18 and pneumatic discharge 19. Compressed air which enters pneumatic input 18 is intended to agitate the ball bearings within canister 1 to assist in moving them toward floor opening 17. Air which is forced into canister 1 is allowed to escape through pneumatic discharge 19.

Ball bearings which fall through floor opening 17 immediately enter inlet 20 of loading tube 2. Inlet 20 is secured to floor opening 17 as it passes through platform bore 24 of upper platform 9. Upper platform 9, in turn, serves as a mounting base for the entire canister 1. Ball bearings which enter the loading 2 become stacked as indicated generally at 22. Should there be an ample supply of ball bearings in canister 1, stack 22 will run the entire length of loading tube 2. The presence or absence of ball bearings in loading tube 2 is detected by proximity sensor 5.

Proximity sensor 5 is mounted upon bracket 51 at an approximate midpoint along loading tube 2. Bracket 51 is securely affixed to frame 6. Proximity sensor 5 includes a sensing tip 50 which determines whether or not a ball bearing is present specifically within sensing area 23 of loading tube 2. Should a "low-supply" condition exist, proximity sensor 5 transmits a signal to a predetermined entity via transmission cable 52.

FIG. 1 also presents a side view of the piston assembly 3 of the present invention. Piston assembly 3 includes piston block 8, pistons 30, pneumatic fittings 31, piston head 34, shuttle block 32 and ball shuttle 33. As shown in FIG. 1, piston assembly 3 is in a "loading" position whereby ball bearings from stack 22 in loading tube 2 may be "loaded" into ball shuttle 33. Employing pneumatic controls via pneumatic fittings 31, piston assembly 3 may be actuated between this loading position and an "ejecting" position pursuant to a predetermined control schedule. Once piston assembly 3 shifts to its ejecting position (not shown), ball shuttle 33 is positioned immediately between discharge tube inlet 40 and compressed air orifice 43. Compressed air which enters pneumatic fitting 41, which is secured within air block 42, passes through orifice 43 and forces a ball bearing in ball shuttle 33 through discharge tube 4 to its assembly destination point.

FIG. 2 presents a complete side view of the present invention and offers a better perspective on certain of its components. Frame 6, base 7 and upper platform 9 are secured at right angles to each other as indicated to provide the basic mounting structure for the remaining components. Bracket 51 is also mounted at a right angle to frame 6 in order to position the sensing tip 50 of proximity sensor 5 at the desired location with respect to sensing area 23 of loading tube 2.

As the entire ball bearing feeding unit is relatively compact and lightweight, it may be secured to an assembly machine in a variety of ways either through frame 6 or base 7.

FIG. 2 also offers the third dimension of pistons 30 and piston heads 34 in relation to both shuttle block 32 and piston block 8.

Referring now to FIG. 3, the top view of the present invention is shown whereby the position of cap 12 is exemplified with respect to canister top 25. Pneumatic fittings 18 and 41 protrude outwardly at right angles from their respective components and allow for convenient connection to pneumatic tubing.

FIG. 4 presents a top view of the overall piston assembly 3 including piston block 8, pistons 30, piston heads 34, shuttle block 32 and ball shuttle 33. The relatively wide body of piston block 8 is intended to enhance the stability of both pistons 30 and piston heads 34 as they move from a loading position to an ejecting position. As shuttle block 32 moves to such ejecting position, ball shuttle 33 becomes substantially aligned with both discharge tube inlet 40 and compressed air orifice 43. Stability of the piston block 8, in turn, is enhanced by its mounting to the relatively large base 7.

FIG. 5 presents the details of the proximity sensor 5 mounting as viewed from the upper platform 9. Bracket 51 extends outwardly from frame 6 in parallel fashion to upper platform 9. Upper platform 9 and bracket 51 include a platform hole 24 and a bracket hole 27, respectively, through which loading tube 2 may pass. Proximity sensor 5 is preferably threadably received by bracket 51 and specifically positioned such that sensing tip 50 is in proximate relation to the desired sensing area 23.

Turning now to FIG. 6, a top view of shuttle block 32 is shown separate and apart from the rest of piston assembly 3. Shuttle block 32 is integrally formed with ball shuttle 33.

FIG. 7 presents an exploded, cross-sectional view of the ball shuttle 33 within shuttle block 32. The specific physical dimensions of ball shuttle 33 are such that it comfortably accommodates a single ball bearing within its walls. The bottom end of ball shuttle 33 is openly connected to shuttle air orifice 35 to accept, upon being placed in an ejecting position, a blast of compressed air. The diameter of shuttle air orifice 35 is significantly smaller than the diameter of ball shuttle 33 so as to allow a ball bearing to come to rest upon the bottom end of ball shuttle 33 without falling through orifice 35.

As we examine the cutaway view of the canister 1 in FIG. 8, a better understanding may be had of the specific function of ball trap 13. As a plurality of ball bearings 26 are poured into canister 1, some ball bearings will fall into vertical channel 15 and through horizontal path 16 while the remaining ones are supported above by trap top 14. Compressed air which is then forced through pneumatic input fitting 18 agitates the supply of ball bearings so as to assist them toward floor open 17. Pneumatic discharge fitting 19 is provided to allow air to be drawn out of canister 1 while simultaneously assisting ball bearings down vertical channel 15. Horizontal path 16 is specifically dimensioned so as to allow but a single layer of ball bearings to pass therethrough. It should be noted that all components shown in FIG. 8 which come in contact with the ball bearings are constructed from non-ferrous materials to prevent the induction of magnetism.

FIG. 9 presents a top view of ball trap 13 to offer some perspective of its shape with respect to the canister 1. Ball trap 13 includes an outer edge 45 having a diameter just slightly less than an inner diameter of canister 1. Accordingly, all bearings which are inserted into canister 1 will remain supported by the top surface of ball trap 13 until they fall into vertical channel 15.

FIG. 10 is a top view of canister floor 11 with dashed lines representing the entire length of inlet bore 46 and outlet bore 48 of pneumatic input fitting 18 and pneumatic discharge fitting 19, respectively. Compressed air which enters through pneumatic input fitting 18 travels the length of inlet bore 46 and ultimately is forced through outlet apertures 47 and into canister 1. The force of such compressed air assists in agitating the ball bearings in canister 1 toward floor opening 17. The accumulation of compressed air in canister 1 is then allowed to escape through outlet apertures 49 in outlet bore 48 which, in turn, connects to atmosphere via pneumatic discharge fitting 19.

FIG. 11 presents an isolated view of ball trap 13 as it is also shown in FIG. 8. Ball trap 13 includes three narrow support legs 55 which serve the dual purpose of supporting the ball trap 13 when a pile of ball bearings is loaded upon trap top 14 and positioning the trap face 57 at the desired height whereby ball bearings are allowed to pass underneath. Each support leg 55 further includes a screw receptacle 56 whereby the ball trap 13 may be securely affixed to the canister floor 11.

FIG. 12 offers a side view of ball trap 13 indicating the relative spacing between each of support legs 55.

The top view of ball trap 13 as shown in FIG. 13 offers a complete perspective of the trap's individual components. Support legs 55 are spaced apart at approximately 90° with respect to one another and positioned on the outermost edge 45 of the ball trap 13. Trap face 57 drops at a right angle to an upper surface of ball trap 13 and has a substantially planar face.

Lastly, FIG. 14 shows the piston assembly 3 in the second of its two possible positions—an ejecting position. Upon being pneumatically controlled, through fitting 31, to shift from position A (loading position) to position B (ejecting position) ball shuttle 33 moves from concentric alignment with loading tube outlet 21 to concentric alignment with discharge tube inlet 40. Such movement also includes the shifting of pistons 30, piston heads 34 and shuttle block 32 from position A to position B while piston block 8 and air block 42 remain in their stationary positions. As shuttle block 32 shifts from position A to B, top surface 36 ensures that the ball bearing stack 22 within loading tube 2 remains in place. Once ball shuttle 33 completes its shift from position A to position B, compressed air attached to pneumatic fitting 41 rushes through orifice 43 and shuttle air orifice 35 to eject the isolated ball bearing 44 out of ball shuttle 33 and into discharge tube 4. Immediately thereafter, piston assembly 3 is pneumatically controlled to shift back to position A.

While the present invention has been illustrated in some detail according to the preferred embodiment shown in the foregoing drawing and description, it will be apparent to those skilled in the pertinent art that variations and equivalents may be made within the spirit and scope of that which has been expressly disclosed. Accordingly, it is intended that the scope of the invention be limited solely by the scope of the hereafter appended claims and not by any specific wording in the foregoing description.

We claim:

1. An apparatus for feeding ball bearings in an assembly production process, comprising:

a container maintaining a supply of ball bearings;

means for transferring said ball bearings from said container to an ejecting area along a single-file path;

means for placing a first ball bearing from said single-file path in an ejecting position;

means for ejecting said first ball bearing from said ejecting position to an assembly destination point; and support members by which said apparatus may be affixed to an automatic assembly machine.

said means for placing a first ball bearing in an ejectment position including a two-position, pneumatically-actuated piston assembly, said piston assembly having a ball shuttle capable of receiving said first ball bearing in a loading position and subsequently positioning said first ball bearing in an ejecting position, said means for ejecting said first ball bearing from said ejecting position including a small pneumatic orifice and an elongated delivery robe, said orifice and said delivery tube positioned on substantially opposite sides of said ball shuttle when said piston assembly is in said ejectment position such that compressed air from said orifice forces said first ball bearing out of said ball shuttle and through said delivery robe to said assembly destination point, said container including a removable cap, a ball trap and a floor assembly, said ball trap mounted in spaced-apart relation to said floor assembly to simultaneously support a pile of ball bearings while allowing a single horizontal layer of ball bearings to pass underneath to said floor assembly, said floor assembly having both an opening through which a single ball bearing may pass through to said means for transferring and a plurality of pneumatic input and output apertures to agitate said single layer of ball bearings to move toward said opening.

2. The apparatus for feeding ball bearings as in claim 1, wherein said means for transferring said ball bearings from said container to an ejecting area includes a substantially tubular stem segment having an internal diameter slightly greater than a diameter of said ball bearings, a first end of said stem segment cooperatively affixed to said floor assembly opening and a second end of said stem segment aligned immediately adjacent to said ball shuttle when said piston assembly is in said loading position.

3. The apparatus for feeding ball bearings as in claim 2, said apparatus further comprising means for sensing a low-quantity condition of ball bearings in said apparatus.

4. The apparatus for feeding ball bearings as in claim 3, wherein said means for sensing a low-quantity condition includes a ball bearing proximity sensor mounted in spaced-apart relation to said stem segment.

5. A lightweight and efficient apparatus for delivering a clean and dry supply of ball bearings, one at a time, to a particular point along an assembly production process; said apparatus comprising a ball bearing container, a tubular stem segment, a two-position piston assembly, a delivery tube and framework providing at least one support through which said apparatus is securable to an automatic assembly machine; said container including a removable cap, a ball trap and a floor assembly; said ball trap positioned within said container and mounted in parallel and spaced-apart relation to said floor assembly wherein a topside of said ball trap supports a pile of said ball bearings while a bottom side simultaneously allows a single layer of said ball bearings to pass underneath to said floor assembly; said floor assembly having both an opening through which ball bearings from said single layer may pass through to said tubular stem segment and a plurality of pneumatic input and output apertures to agitate said single layer of ball bearings to move toward said opening; said tubular stem segment having a first end, a second end and an internal diameter slightly greater than a diameter of said ball bearings and approximately equal to a diameter of said opening; said first end of said stem segment cooperatively affixed to said floor assembly opening wherein ball bearings may pass therethrough in a single-file manner; said second end of said stem segment positioned immediately adjacent a ball shuttle of said two-position piston assembly when said piston assembly is in a loading position such that a first ball bearing in said stem segment may drop into said ball shuttle; said piston assembly being pneumatically actuated to move from said loading position to an ejecting position wherein a top side of said ball shuttle becomes aligned with a first end of said delivery tube and a bottom side of said ball shuttle becomes aligned with a small pneumatic orifice; said orifice supplying a burst of compressed air to force said first ball bearing out of said ball shuttle and through said delivery tube to said particular point along an assembly production process.

6. The lightweight and efficient apparatus for delivering a clean and dry supply of ball bearings as in claim 5, said apparatus further comprising a proximity sensor mounted in spaced-apart relation to an approximate midpoint of said tubular stem segment; said sensor to provide an alerting signal upon detecting the non-presence of a ball bearing along said stem segment.

7. A method of feeding ball bearings in an assembly production process, comprising the steps of:

maintaining a supply of ball bearings in a central area;

transferring said ball bearings from said central area to an ejecting area along a single-file path;

placing a first ball bearing from said single-file path in an ejecting position; and ejecting said first ball bearing from said ejecting position to an assembly destination point, said step of placing a first ball bearing in an ejecting position further including initially accommodating said first ball bearing in a loading position and subsequently shifting said first ball bearing to an ejecting position via pneumatic actuation, said step of ejecting said first ball bearing from said ejecting position further including applying a burst of compressed air to one side of said first ball bearing to force said first ball bearing through a delivery tube to said assembly destination point, said step of maintaining a supply of ball bearings in a central area further including isolating a single layer of ball bearings from said supply and pneumatically agitating said layer in preparation for transference.

8. The method of feeding ball bearings as in claim 7, further comprising the steps of sensing the non-presence of a ball bearing as said ball bearings are transferred from said central area to said ejecting area along a single-file path and transmitting a low-quantity signal upon said sensing.

9. A method of delivering a clean and dry supply of ball bearings, one at a time, to a particular point along an assembly production process; said method comprising the steps of maintaining an ample supply of ball bearings within a central area; allowing a single layer of ball bearings to become isolated from said supply; pneumatically agitating said single layer to move to a transfer point; transferring said ball bearings from said transfer point to an ejecting area in single-file fashion; accommodating a first ball bearing being transferred in a loading position at said ejecting area; shifting said first ball bearing to an ejecting position via pneumatic actuation; and applying a burst of compressed air to one side of said first ball bearing to force said first ball bearing through a delivery tube to said assembly destination point.

10. The method of delivering a clean and dry supply of ball bearings as in claim 9, further comprising the steps of sensing the non-presence of a ball bearing as said ball bearings are transferred from said central area to said ejecting area along a single-file path and transmitting a low-quantity signal upon said sensing.

* * * * *